United States Patent [19]
Kani et al.

[11] Patent Number: 5,808,544
[45] Date of Patent: Sep. 15, 1998

[54] INTRUSION DETECTING APPARATUS FOR A VEHICLE

[75] Inventors: Hiroyuki Kani; Masahiro Goto; Ikuo Hayashi, all of Nishio; Takeo Tsuzuki, Toyota, all of Japan

[73] Assignees: Denso Corporation, Kariya; Nippon Soken, Inc., Nishio, both of Japan

[21] Appl. No.: 807,524

[22] Filed: Feb. 27, 1997

[30] Foreign Application Priority Data

| Feb. 29, 1996 | [JP] | Japan | 8-043494 |
| Apr. 9, 1996 | [JP] | Japan | 8-086884 |

[51] Int. Cl.$^6$ ............................ B60R 25/10; G08B 13/18
[52] U.S. Cl. ............................ 340/426; 340/541; 340/554
[58] Field of Search ............................ 340/425.5, 426, 340/541, 552, 554, 529, 538, 515, 943, 506, 507; 367/93, 94

[56] References Cited

U.S. PATENT DOCUMENTS

| 3,737,690 | 6/1973 | Antonio | 310/316 |
| 3,781,859 | 12/1973 | Hermans | 340/529 |
| 4,275,390 | 6/1981 | Heywang et al. | 340/554 |
| 4,729,120 | 3/1988 | Steiner et al. | 340/554 |
| 4,743,886 | 5/1988 | Steiner et al. | 340/554 |
| 4,807,255 | 2/1989 | Idland | 340/538 |
| 4,929,925 | 5/1990 | Bodine et al. | 340/426 |
| 5,168,173 | 12/1992 | Windsor | 307/139 |
| 5,424,711 | 6/1995 | Muller et al. | 340/426 |

FOREIGN PATENT DOCUMENTS

| 61-170081 | 10/1986 | Japan . |
| 6-52449 | 2/1994 | Japan . |
| 7-5062 | 1/1995 | Japan . |

*Primary Examiner*—Brent A. Swarthout
*Assistant Examiner*—Van T. Trieu
*Attorney, Agent, or Firm*—Cushman Darby & Cushman IP Group of Pillsbury Madison & Sutro LLP

[57] ABSTRACT

An intrusion detecting apparatus for a vehicle comprising an ultrasonic transmitting/receiving sensor, an intrusion detecting unit for detecting whether or not a person intrudes into a passenger compartment, based on the received signal, a stopping unit for intermittently stopping the transmission from the transmitter, and a cover detecting unit for detecting whether or not the sensor is covered, based on the signal received after stopping the transmission of the signal and, in response to a predetermined condition representing that the sensor is covered, whereby it can correctly determine whether or not the sensor is covered, improving the accuracy of the detection of an illegal intrusion of a person. At least one of a transmitter and a receiver in the sensor and the intrusion detecting unit is also intermittently operated to reduce the power consumption.

30 Claims, 11 Drawing Sheets

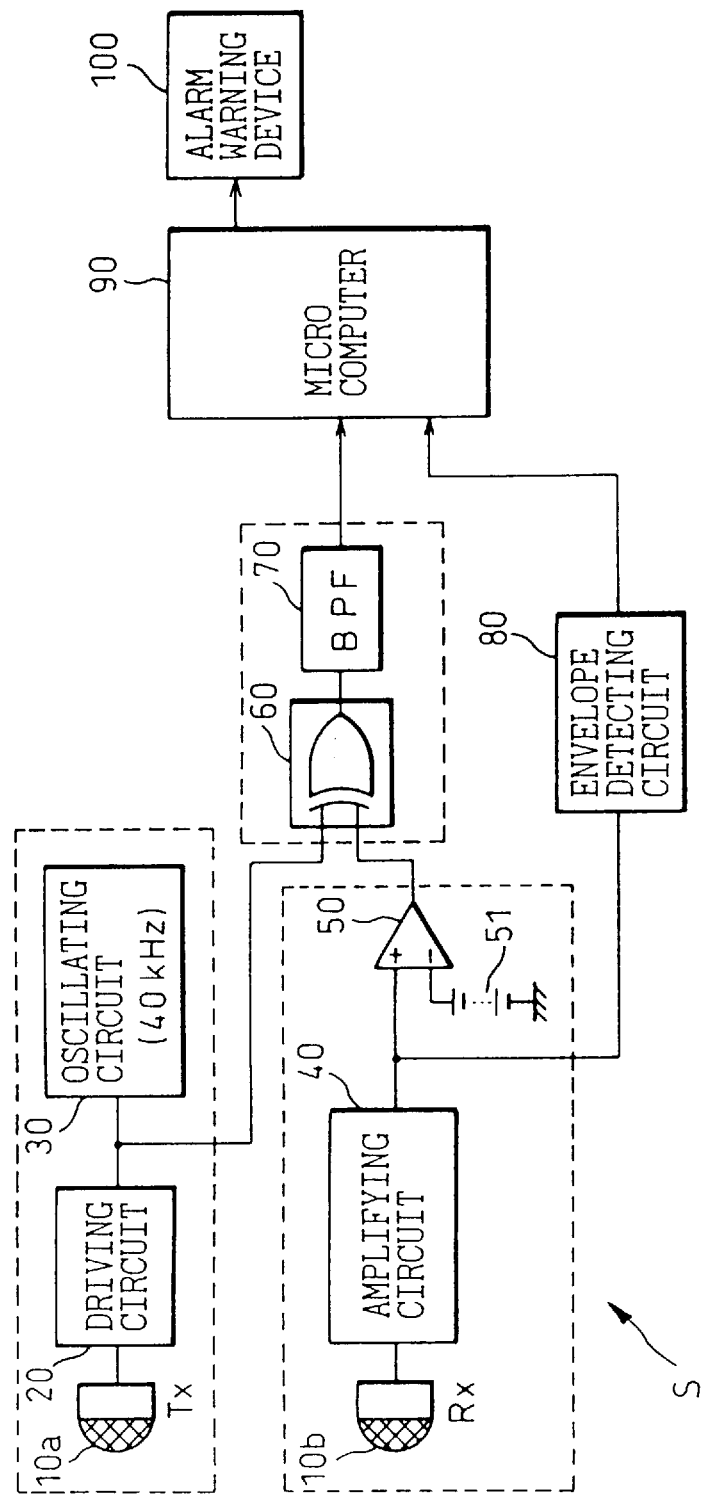

INTRUSION DETECTING APPARATUS FOR A VEHICLE

BACKGROUND OF THE INVENTION

1. Field of the Invention

The present invention relates to an intrusion detecting apparatus for a vehicle, and more particularly to an intrusion detecting apparatus for a vehicle to detect an illegal intrusion of a person into a vehicle by utilizing an ultrasonic transmitting/receiving sensor including an ultrasonic transmitter and an ultrasonic receiver.

2. Description of the Related Art

Conventionally, as a countermeasure to enable the detection of an intruding person even when the ultrasonic transmitting/receiving sensor is covered by some parts, an intrusion detecting apparatus disclosed in Japanese Utility Model Publication (Kokai) No. 61-170081 is known.

According to the above-mentioned known intrusion detecting apparatus, a change of an ultrasonic signal receiving level is utilized. That is, when the ultrasonic transmitting/receiving sensor is covered by hands or a covering case, the ultrasonic receiving signal level is changed. In other words, before completely covering the ultrasonic transmitting/receiving sensor, the ultrasonic signal receiving level is considered to be raised, and after the ultrasonic transmitting/receiving sensor is completely covered, the ultrasonic signal receiving level is considered to be lowered. By utilizing this change, it is possible to detect whether or not the ultrasonic transmitting/receiving sensor is covered. When it is judged that the sensor is covered, it can be assumed that there has been an illegal intrusion of a person into the passenger compartment. Thus an intrusion of a person may be detected.

In such an intrusion detecting apparatus, however, when the ultrasonic transmitter and the ultrasonic receiver which constitute the ultrasonic transmitting/receiving sensor are arranged closely to each other, after the completion of the covering of the ultrasonic transmitter and the ultrasonic receiver, the ultrasonic signal receiving level is not lowered but, contrary to the expectation, it is raised.

The reason for the above phenomenon is thought to be as follows. That is, when the ultrasonic transmitter is covered by a covering case or hands, the ultrasonic signal transmitted from the transmitter is reflected by the covering case or hands, and the reflected signal is transmitted through the narrow space to the ultrasonic receiver with almost no attenuation.

Therefore, under such a phenomenon, the receiving signal level at the ultrasonic receiver becomes higher than the above-mentioned threshold, so that there is a problem in that it is not possible to correctly determined whether or not the ultrasonic transmitting/receiving sensor is covered, and that the detection of illegal intrusion of a person may be an error.

SUMMARY OF THE INVENTION

In view of the above problem, an object of the present invention is to provide an intrusion detecting apparatus for a vehicle, in which, by utilizing the change of the ultrasonic signal receiving level after stopping the transmission of the ultrasonic signal, it is possible to correctly determine whether or not the ultrasonic transmitting/receiving sensor is covered, so as to improve the accuracy of the detection of an illegal intrusion.

To attain the above object, according to a first aspect of the present invention, attention is paid to the fact that the state of the ultrasonic signal received by the ultrasonic receiver after stopping the transmission of the ultrasonic signal is different, depending on whether or not the ultrasonic transmitting/receiving sensor is covered. There is provided an intrusion detecting apparatus for a vehicle comprising a cover detecting unit for detecting whether or not the ultrasonic transmitting/receiving sensor is covered in response to a predetermined condition representing that the ultrasonic transmitting/receiving sensor is covered.

When the ultrasonic transmitting/receiving sensor is not covered, the ultrasonic signal received after stopping the transmission of the ultrasonic signal does not satisfy the above-mentioned predetermined condition, whereas when the ultrasonic transmitting/receiving sensor is covered, the ultrasonic signal received after stopping the transmission of the ultrasonic signal satisfies the above-mentioned predetermined condition.

Therefore, in case of the former, it is detected that the ultrasonic transmitting/receiving sensor is not covered; and in the later case, it is detected that the ultrasonic transmitting/receiving sensor is covered. This means that, even when the ultrasonic transmitting/receiving sensor is covered, and even when the ultrasonic transmitter and the ultrasonic receiver are arranged closely, an illegal intrusion can be correctly detected.

According to the second aspect of the present invention, the cover detecting unit determines only when the level of the ultrasonic signal received by the ultrasonic receiver is equal to or below an upper limit level in the levels representing that the ultrasonic transmitting/receiving sensor is covered.

In this case, when the ultrasonic transmitting/receiving sensor is not covered, the ultrasonic signal received after stopping the transmission of the ultrasonic signal is not below the above-mentioned upper limit level; whereas when the ultrasonic transmitting/receiving sensor is covered, the ultrasonic signal received after stopping the transmission of the ultrasonic signal is equal to or below the above-mentioned upper limit level.

Therefore, in the case of the former, it is detected that the ultrasonic transmitting/receiving sensor is not covered; and in the later case, it is detected that the ultrasonic transmitting/receiving sensor is covered. As a result, similar to the first aspect of the present invention, an illegal intrusion can be correctly detected even when the ultrasonic transmitting/receiving sensor is covered.

According to a third aspect of the present invention, a judgement is made as to whether or not the number counted by a counting unit reaches a predetermined number representing a period suitable to exclude an influence of disturbance on the result detected by the cover detecting unit, whereby the accuracy of the detection of the cover of the ultrasonic transmitting/receiving sensor is further improved.

According to a fourth aspect of the present invention, a level determining unit determines, each time after stopping the transmission, whether or not the level of the ultrasonic signal received by the ultrasonic receiver is equal to or below an upper limit level in the levels representing that the ultrasonic transmitting/receiving sensor is covered. Then a setting unit sets, each time after stopping the transmission, count data representing the result of the determination by the level determining unit. Further, a calculating unit calculates the sum of a predetermined number of said count data which are the latest, the predetermined number corresponding to a predetermined period suitable to exclude an influence of disturbance on the sum. Further, a sum determining unit determines, each time after stopping the transmission, whether or not the sum reaches a predetermined value representing that the ultrasonic transmitting/receiving sensor is covered. Then the cover detecting unit detects, when the sum determining means determines that the sum reaches the predetermined value, that the ultrasonic transmitting/receiving sensor is covered.

By this construction, each time when the sum of the predetermined number of the latest count data corresponding to the above-mentioned predetermined period is calculated, it is detected whether or not the ultrasonic transmitting/receiving sensor is covered. Therefore, the time interval for this detection can be shortened so that the effects in the second aspect of the invention can be attained with more frequent judgements of whether or not the ultrasonic sensor is covered.

According to a fifth aspect of the present invention, the ultrasonic transmitting/receiving sensor is provided on a front windshield in the passenger compartment.

According to a sixth aspect of the present invention, the ultrasonic transmitting/receiving sensor is provided on an upper portion of each seat belt pillar in the passenger compartment.

According to the seventh aspect to eleventh aspect of the present invention, a control unit intermittently operates at least one of the ultrasonic transmitter, said ultrasonic receiver, and the intrusion detecting unit. During this intermittent operation, a judging unit judges whether or not a person has illegally intruded into a passenger compartment based on a doppler shift amount.

Thus, when the detection of an illegal intrusion is carried out during a stopped state of the vehicle, the power consumption can be reduced.

According to the ninth aspect of the present invention, a second judging unit judges whether or not the number of judgements by the first judging unit indicating that the doppler shift amount is within the predetermined range reaches a predetermined number by which it can be determined even when there is a disturbance that a person has intruded into the passenger compartment, and the judgement of whether or not there is an illegal intrusion into the passenger compartment is carried out based on the judgement by the second judging unit.

By this construction, the detection of an illegal intrusion by an intrusion detecting apparatus of an ultrasonic doppler type can be correctly effected.

According to the tenth aspect of the present invention, a first judging unit judges whether or not a doppler shift amount is within a predetermined range representing an illegal intrusion into said passenger compartment, the predetermined period is extended when the first determining unit determines that the doppler shift amount is within the predetermined amount. Then, a second judging unit judges whether or not the judgement that the doppler shift amount is within the predetermined range continues for the period extended by the extending means. The judgement of whether or not there is an illegal intrusion into the passenger compartment is carried out based on the judgement by the second judging unit.

By this construction, the same effects as those in the ninth aspect of the invention can be attained.

BRIEF DESCRIPTION OF THE DRAWINGS

The above object and features as well as other features of the present invention will be more apparent from the following description of the preferred embodiments when read with reference to the accompanying drawings, wherein:

FIG. 1 is a block diagram of an intrusion detecting apparatus according to a first embodiment of the present invention;

DESCRIPTION OF THE PREFERRED EMBODIMENTS

In the following, embodiments of the present invention will be described with reference to the drawings.

Figure 2A:
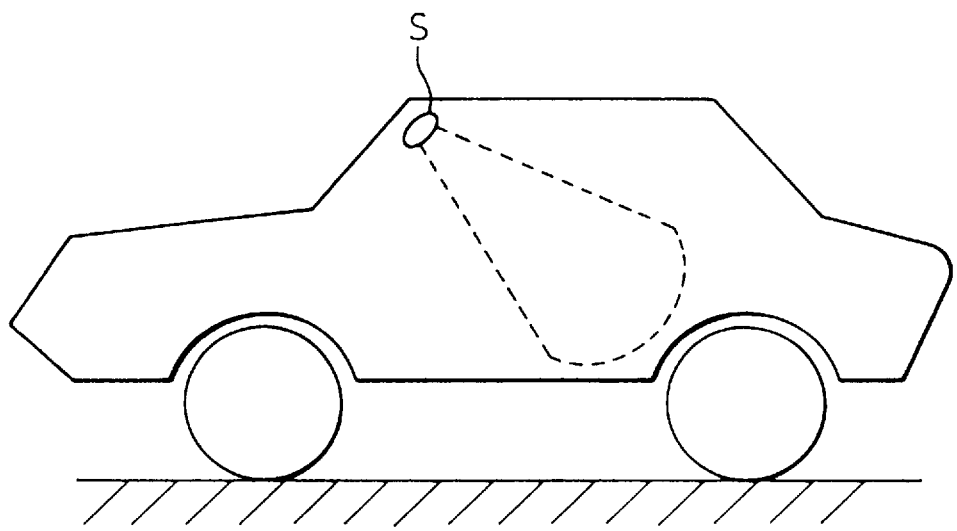
FIG. 2A is a diagram showing an example of an attached position of an ultrasonic transmitting and receiving sensor in a vehicle passenger compartment.
Figure 2B:
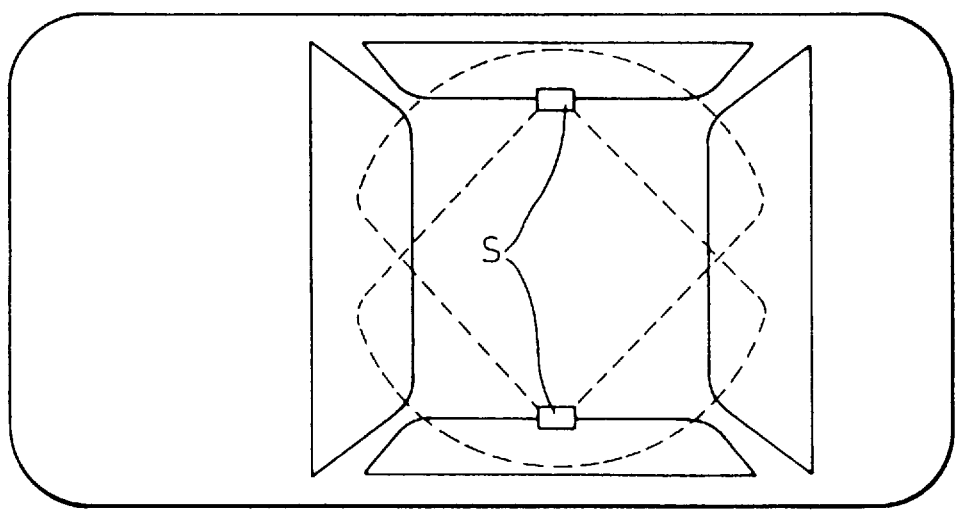
FIG. 2B is a diagram showing another example of an attached position of an ultrasonic transmitting and receiving sensor in a vehicle passenger compartment.

FIG. 1 is a block diagram showing an intrusion detecting apparatus according to an embodiment of the present invention. The intrusion detecting apparatus includes an ultrasonic transmitting/receiving sensor S. This ultrasonic transmitting/receiving sensor S is provided, for example, on a central portion of an upper edge of a front windshield in a vehicle passenger compartment, as shown in FIG. 2A. Alternatively, the sensor S may be provided on an upper portion of each seat belt pillar, as shown in FIG. 2B.

The ultrasonic transmitting/receiving sensor S includes an ultrasonic transmitter 10a and an ultrasonic receiver 10b, which are arranged close to each other.

The ultrasonic transmitter 10a is connected through a driving circuit 20 to an oscillating circuit 30. The oscillating circuit 30 generates oscillating pulses with an oscillating frequency f (=40 KHz). The driving circuit 20 sequentially receives the oscillating pulses from the oscillating circuit 30 to drive the ultrasonic transmitter 10a. Thus, the ultrasonic transmitter 10a transmits an ultrasonic wave in response to the driving circuit 20. The transmitted ultrasonic wave is reflected by objects in the passenger compartment of the vehicle.

According to a first example of the first embodiment of the present invention, the driving circuit 20 includes at its input stage a semiconductor switching element such as a transistor or the like which is controlled to be turned ON or OFF by a microcomputer 90. When the semiconductor switching element is turned ON, the driving circuit 20 drives the ultrasonic transmitter 10a based on the oscillating pulses from the oscillating circuit 30. When the semiconductor switching element is turned OFF, the driving circuit 20 stops driving the ultrasonic transmitter 10a. The ultrasonic transmitter 10a, the driving circuit 20 and the oscillating circuit 30 constitute an ultrasonic transmitting portion of the ultrasonic transmitting/receiving sensor S.

Figure 4:
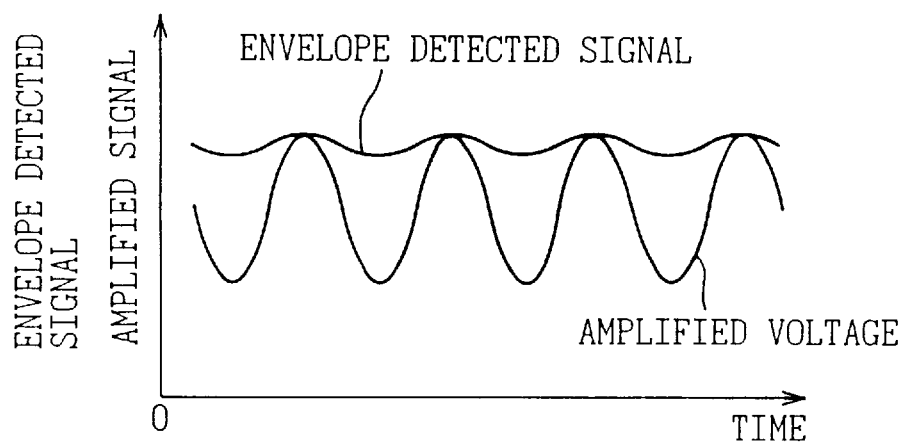
FIG. 4 is a timing chart showing an input/output wave form of the envelope detecting circuit shown in FIG. 1.

The ultrasonic receiver 10b receives the transmitted ultrasonic signal which has been reflected in the passenger compartment, and outputs it as a received signal to an amplifying circuit 40. The amplifying circuit 40 amplifies the received signal from the ultrasonic receiver 10b to output it as an amplified voltage having a sinusoidal waveform, as shown in FIG. 4, to a comparing circuit 50.

The comparing circuit 50 compares the amplified voltage from the amplifying circuit 40 with a reference voltage Vr provided by a reference power supply 51. Only when the amplified voltage is higher than the reference voltage Vr, does the comparing circuit 50 output a compared signal of High level. The ultrasonic receiver 10b, the amplifying circuit 40, the comparing circuit 50 and the reference power supply 51 constitute a receiving portion of the ultrasonic transmitting/receiving sensor S.

A phase difference outputting circuit 60 consists of an exclusive OR gate (hereinafter referred to as an EXOR gate 60). The EXOR gate 60 generates a phase difference pulse signal by determining a phase difference between the phase of the oscillating pulse from the oscillating circuit 30 and the phase of the compared signal from the comparing circuit 50.

A bandpass filter 70 (hereinafter referred to as a BPF 70) filters out, from the phase difference pulse signal from the EXOR gate 60, frequency components corresponding to an intrusion speed of a person to generate a doppler shift signal. In this specification, the doppler shift signal is defined as a difference signal between the transmitted signal and the reflected and received signal. Here, the frequency difference specified by the doppler shift signal has a value based on the relative speed of a person with respect to the ultrasonic transmitting/receiving sensor S. The EXOR gate 60 and the BPF 70 constitutes a doppler detecting portion in the ultrasonic transmitting/receiving sensor S.

Figure 3:
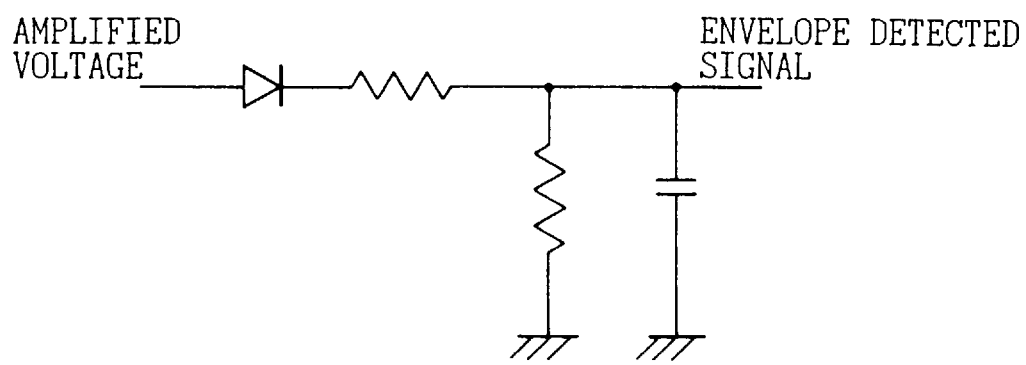
FIG. 3 is a circuit diagram of an envelope detecting circuit in the apparatus shown in FIG. 1.

An envelope detecting circuit 80 has a circuit construction as shown in FIG. 3, which functions as a receiving level detecting means. As shown in FIG. 4, the envelope detecting circuit 80 detects an envelope of an amplitude of an amplified voltage output from the amplifying circuit 40 to output an envelope detected signal.

Figure 5:
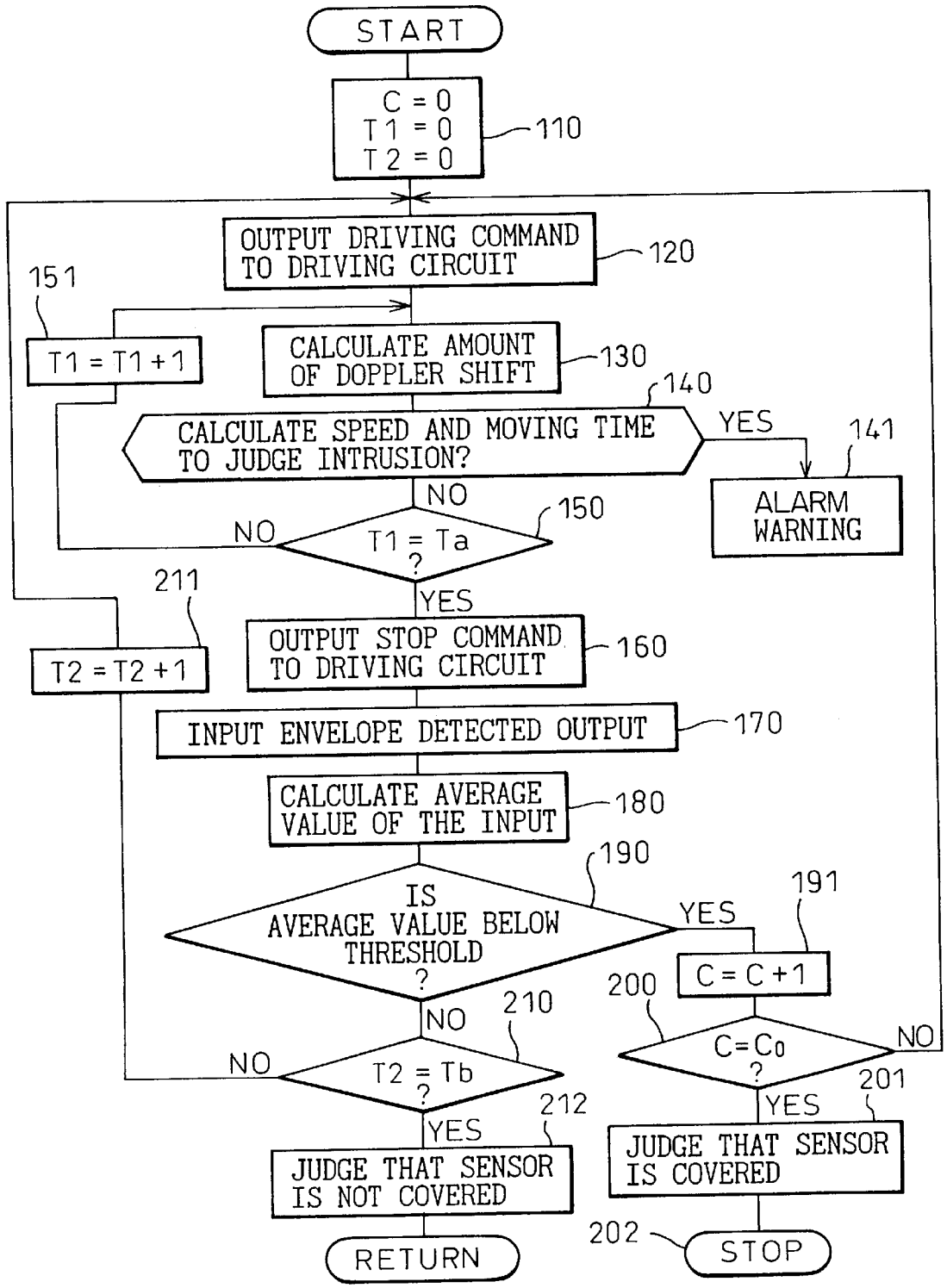
FIG. 5 is a flowchart showing a first example of the operation of a microcomputer in the apparatus shown in FIG. 1.

Based on the outputs from the BPF 70 and the envelope detecting circuit 80, the microcomputer 90 executes a computer program according to a flowchart shown in FIG. 5 and, during this execution, it performs a calculation necessary to determine whether a person has illegally intruded by detecting the doppler shift signal level or by detecting that the ultrasonic transmitting/receiving sensor is covered. Note that the above-mentioned computer program is previously stored in a read only memory (ROM) in the microcomputer 90.

An alarm warning device 100 is controlled by the microcomputer 90 to sound an alarm when an illegal intrusion is detected.

The operation of the microcomputer 90 is described with reference to the flowchart shown in FIG. 5.

At step 110, count data C, time data T1, and time data T2 are cleared to zero. Then at step 120, a driving command is given to the driving circuit 20. In response to the driving command, the semiconductor switching element in the driving circuit 20 is turned ON so that the oscillating pulses generated at the oscillating circuit 30 are output to the ultrasonic transmitter 10a. Thus, the ultrasonic transmitter 10a transmits an ultrasonic signal into the passenger compartment based on each oscillating pulse from the oscillating circuit 30, and the transmitted ultrasonic signal is reflected by some material in the passenger compartment.

The reflected ultrasonic signal is then received by the ultrasonic receiver 10b. The received signal is amplified by the amplifying circuit 40 to be output as an amplified voltage. The amplified voltage is then compared by the comparing circuit 50 with the reference voltage Vr from the reference power supply 51. When the amplified voltage is higher than the reference voltage Vr, the comparing circuit 50 outputs a high level compared signal.

The phase difference output circuit 60 then generates a phase difference output signal in accordance with the difference between the phase of the oscillating pulse from the oscillating circuit 30 and the phase of the compared signal from the comparing circuit 50, and the BPF 70 outputs a doppler shift signal based on the phase difference output signal.

The envelope detecting circuit 80 detects the envelope of the amplified voltage from the amplifying circuit 40 to output an envelope detected signal.

After the process at step 120, the process proceeds to step 130 where an amount of doppler shift is calculated based on the doppler shift signal from the BPF 70. The amount of doppler shift is defined as a digital value calculated by the microcomputer 90.

Then, at step 140, based on the amount of the doppler shift, the relative speed of intrusion by a person into the passenger compartment and the moving time are calculated. Based on the calculated values, it is judged whether or not there is an illegal intrusion into the passenger compartment.

Figure 6:
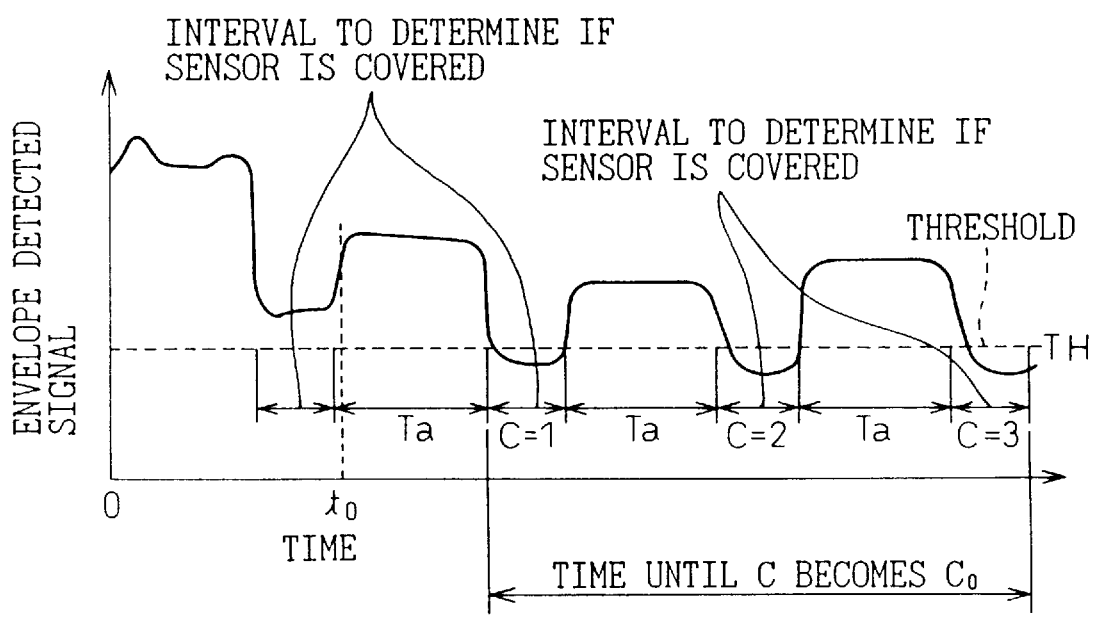
FIG. 6 is a timing chart showing an output wave form of the envelope detecting circuit shown in FIG. 1, taking ultrasonic transmission stop periods into account.

When the judgement at step 140 is "YES", the process proceeds to step 141 where the alarm warning device 100 generates an alarm and the execution of the computer program is stopped. On the other hand, when the judgement at step 140 is "NO", the process proceeds to step 150 where it is judged whether or not the time data T1 reaches a predetermined period Ta (for example, 0.3 seconds). The predetermined period Ta is shown in FIG. 6 as an example. When the time data T1 has not reached the predetermined period Ta, the process proceeds to step 151 where the time data T1 is incremented. When the time data T1 reaches the predetermined period Ta, the process proceeds to step 160 where a stop command is output to the driving circuit 20. In response to the stop command, the driving circuit 20 turns OFF the semiconductor switching element to cut off the ultrasonic transmitter 10a from the oscillating circuit 30. Thus, the ultrasonic transmitter stops transmitting the ultrasonic signal.

When the ultrasonic transmitting/receiving sensor S is not covered, the ultrasonic signals which have been transmitted just prior to the stop of the transmission by the ultrasonic transmitter 10a are reflected by a wall in the passenger compartment, and each of the reflected signals will sequentially arrive at the ultrasonic receiver 10b after a constant time (of for example 20 milliseconds) later from the transmitting time. Therefore, even during the stopping of the transmission of the ultrasonic signal, the level of the received signal is raised by the reflected signals. The ultrasonic signal received by the ultrasonic receiver 10b is amplified by the amplifying circuit 40 to be output as an amplified voltage.

On the other hand, when the ultrasonic transmitting/receiving sensor S is covered as a whole, the ultrasonic signals which have been transmitted just prior to the stop of the transmission by the ultrasonic transmitter 10a and which have been reflected by the wall in the passenger compartment are cut by the cover so that these signals are not received by the ultrasonic receiver 10b. Also, the ultrasonic signals which have been transmitted just prior to the stop of the transmission by the ultrasonic transmitter 10a and which have been reflected by the cover without being reflected by the wall in the passenger compartment are transmitted to the ultrasonic receiver 10b within a time shorter than the ultrasonic signals reflected by the wall when the sensor S is not covered. In addition, after stopping the transmission of the ultrasonic signal, the ultrasonic receiver 10b does not receive any signal after receiving the signals reflected by the cover. Therefore, the level of the ultrasonic signal received by the ultrasonic receiver 10b is rapidly lowered. Thus, the amplified voltage from the amplifying circuit 40 is similarly lowered.

In both cases, the envelope of the amplified voltage from the amplifying circuit 40 is detected to generate an envelope detected signal.

Thus, after stopping the operation of the driving circuit 20 at step 160, the envelope detected signal output from the envelope detecting circuit 80 is input to the microcomputer 90 at step 170. Then at step 180, a calculation is performed to obtain an average value of the levels of the envelope detected signals which have been input within a predetermined period (for example 10 milliseconds) after stopping the driving circuit 20.

Then at step 190, the average value of the envelope detected signals is compared with a predetermined threshold TH which represents an upper limit of the average values of the envelope detected signals when the ultrasonic transmitting/receiving sensor S is covered as a whole after stopping the operation of the driving circuit 20.

The envelope detected signal before a time $t_0$ shown in FIG. 6 is one from when the sensor S is not covered. As shown in FIG. 6, the lowered level of the envelope detected signal before the time $t_0$ is higher than the threshold TH.

The envelope detected signal after the time $t_0$ shown in FIG. 6 is one from when the sensor S is covered. As shown in FIG. 6, the lowered level of the envelope detected signal after the time $t_0$ is lower than the threshold TH.

When the average value of the envelope detected signal is equal to or below the above-mentioned threshold TH, it is judged that the ultrasonic transmitting/receiving sensor S is covered as a whole, so that the process proceeds to step 191 where the count data C is incremented. Then at step 200, it is judged whether or not the count data C has reached a predetermined value $C_0$. Here, the predetermined value $C_0$ corresponds to a predetermined period (for example 5 seconds) in which the judgement of whether or not the sensor S is covered as a whole can be made with a good precision. In this example, the predetermined value $C_0$ is 15 which corresponds to 5 seconds.

When the count data C has not yet reached the predetermined value $C_0$, the process returns back to step 120. In contrast, when the count data C has reached the predetermined value $C_0$, it is judged that the state in which the ultrasonic transmitting/receiving sensor S has been covered as a whole for five seconds so that, at step 201, it is judged that the ultrasonic transmitting/receiving sensor S is covered as a whole. After the step 201, the alarm warning device 100 generates an alarm and the execution of the computer program is stopped at step 202.

On the other hand, at step 190, when the average value is not below the threshold level, the process proceeds to step 210 where it is judged whether or not the time data T2 is equal to a predetermined value Tb. When the answer at step 210 is NO, the process proceeds to step 211 where the time data T2 is incremented.

When the answer at step 210 is YES, it is judged that the sensor S is not covered. Therefore, in this case, the alarm warning device 100 does not generate an alarm. After the step 212, the process returns back to step 110.

As described above, according to the first example of the first embodiment of the present invention, it has been noted that the receiving signal level of the ultrasonic signal received by the ultrasonic receiver 10b after stopping the transmission of the ultrasonic signal changed depending on whether or not the sensor is covered. Based on this consideration, the transmission of the ultrasonic signal from the ultrasonic transmitter 10a is stopped each time when an illegal intrusion has been detected for the predetermined period Ta. Then the average value of the envelope detected signals output from the envelope detecting circuit 80 after stopping the transmission is calculated. When the period in which the average value of the envelope detected signals is equal to or less than the threshold for the predetermined period corresponding to the predetermined value $C_0$, it is judged that the sensor is covered. Thus, even when the sensor is covered, the detection of an illegal intrusion can be detected with a high accuracy.

In the above example, the processes at steps 201 or 212 are carried out after the judgement at step 140, however, the step 140 may also be carried out through one flowchart and the steps 201 or 212 may be carried out through another flowchart which is independent from the step 140.

Figure 7:
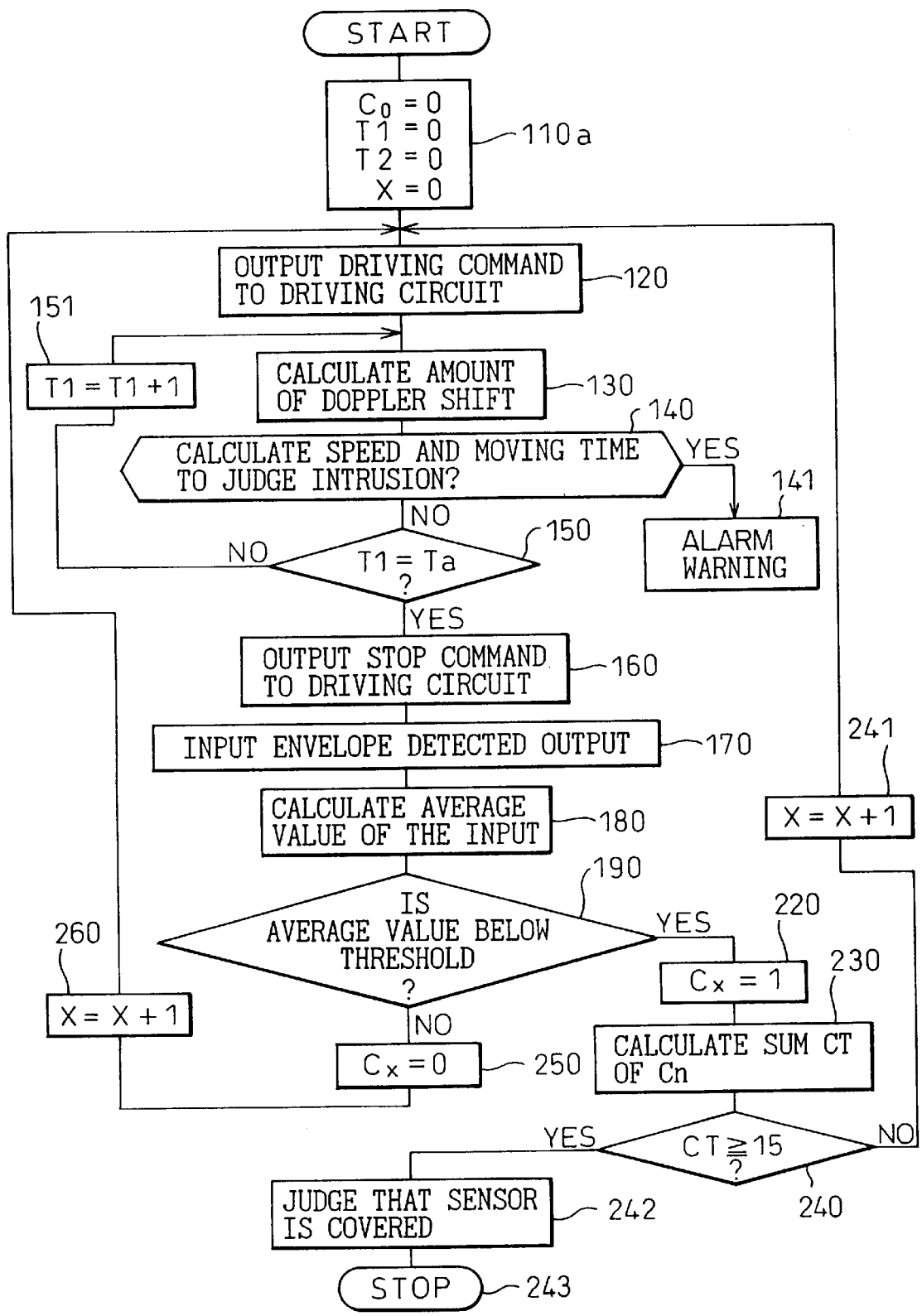
FIG. 7 is a flowchart showing a main portion of a second example of the operation of the microcomputer in the apparatus shown in FIG. 1.

As an alternative to the flowchart of FIG. 5, a modification of the flowchart as shown in FIG. 7 may be employed according to a second example of the first embodiment of the present invention. Accompanied by this modification, the microcomputer 90 executes a computer program according to the flowchart shown in FIG. 7. The other construction of the intrusion detecting apparatus is the same as that shown in FIG. 1.

The difference between FIG. 5 and FIG. 7 is that, in FIG. 7, the step 110 a carries out the initialization of variables $C_0$, T1, T2, and X to be zero, and the process after step 190 is different from that in FIG. 5.

That is, at step 190, when the average value of the envelope detected signal levels is determined to be equal to or below the threshold, the process proceeds to step 220 where the count data $C_x$ is set to be $C_x=1$. The suffix x is a variable which is incremented at step 241 or 260 when the process returns back to step 120.

Then at step 230, the sum CT of the count data $C_n$ is calculated according to the equation:

$$CT = \sum_{n=x-15}^{x} C_n.$$

That is, the sum CT is the sum of the count data $C_x$ from the count data $Ct_x$ of the previous fifteen times to the current time. The number "15" has the same meaning as in the above-described first example of the first embodiment.

At step 240, it is judged whether or not the sum CT reaches the value "15". If it does not reach the value "15", the process proceeds to step 241 where the variable x is incremented, and returns back to step 120. When the sum CT reaches the value "15" at step 240, the process proceeds to step 242 where it is judged that the sensor is covered so that the alarm indicating an illegal intrusion is effected in the same way as in the above-described first example, and at step 243 the computer program is stopped.

It should be noted that, at each time when the sum CT is calculated at step 230, the oldest count data $C_x$ is discarded and the most new count data $C_x$ is added. Accordingly, each time when the judgement at step 190 is "YES", it is judged that the sensor is covered at step 240.

On the other hand, when the judgement at step 190 is "NO", the process proceeds to step 250 where the count data $C_x$ is set to zero. This count data $C_x$=0 will be added to the sum CT at step 230 in the future process. After step 250, the process proceeds to step 260 where the variable x is incremented. Then the process returns back to step 120.

As described above, according to the second example of the first embodiment, each time when it is judged "YES" at step 190, the sum of the count data $C_n$ from the previous fifteen count data $C_x$ to the current count data $C_x$ is calculated, and then at step 240, it is judged whether the sum CT reaches the value "15".

In the before-described first example, after the judgement of "YES" at step 190, each time when it is judged to be "YES" at step 200, that is, each time when the predetermined number $C_0$ corresponding to five seconds has been counted, it was judged that the sensor was covered. In contrast, according to this second example, after the judgement of "YES" at step 190, it is judged whether or not the sensor is covered based on the sum CT of the past fifteen $C_x$ by discarding the old count data that is older than the data before the past fifteen count data. Therefore, the judgement period to judge whether or not the sensor is covered in the second example can be shortened in comparison with the first example. As a result, the frequency of the judgement of whether or not the sensor is covered in the second example can be increased in comparison with the first example. The remaining construction and the effects are the same as those in those in the first example.

From still another point of view, in the intrusion detecting apparatus utilizing the ultrasonic doppler signal, the detection of an illegal intrusion of a person is usually carried out when the vehicle is stopped. Therefore, naturally, the intrusion detecting apparatus must be operated by supplying power during the stopped state of the vehicle. In addition, the intrusion detecting apparatus usually transmits and receives an ultrasonic signal continuously in order to detect an illegal intrusion by detecting movement. As a result, there is a disadvantage such that the power consumption of the intrusion detecting apparatus is large.

In view of the above disadvantage, the inventors of the present invention paid attention to the fact that there is a continuous movement of a person when he intrudes into a vehicle, and analyzed the various conditions of the person's intrusion. As a result, the inventors of the present invention recognized that, even when the intrusion detecting apparatus of a doppler ultrasonic type is intermittently operated, if the intermittent period is made to be sufficiently shorter than the period in which the person moves continuously, and if the intermittent period is made to be as long as possible within the above condition, the intrusion detecting apparatus can provide a proper doppler shift amount corresponding to the intrusion and moving state of a person so as to be able to detect the illegal intrusion, whereby the power consumption can be sufficiently reduced.

Thus, according to the second embodiment of the present invention, there is provided an intrusion detecting apparatus for a vehicle which operates intermittently to detect the doppler shift caused by a person's movement, while the power consumption is reduced.

Figure 8:
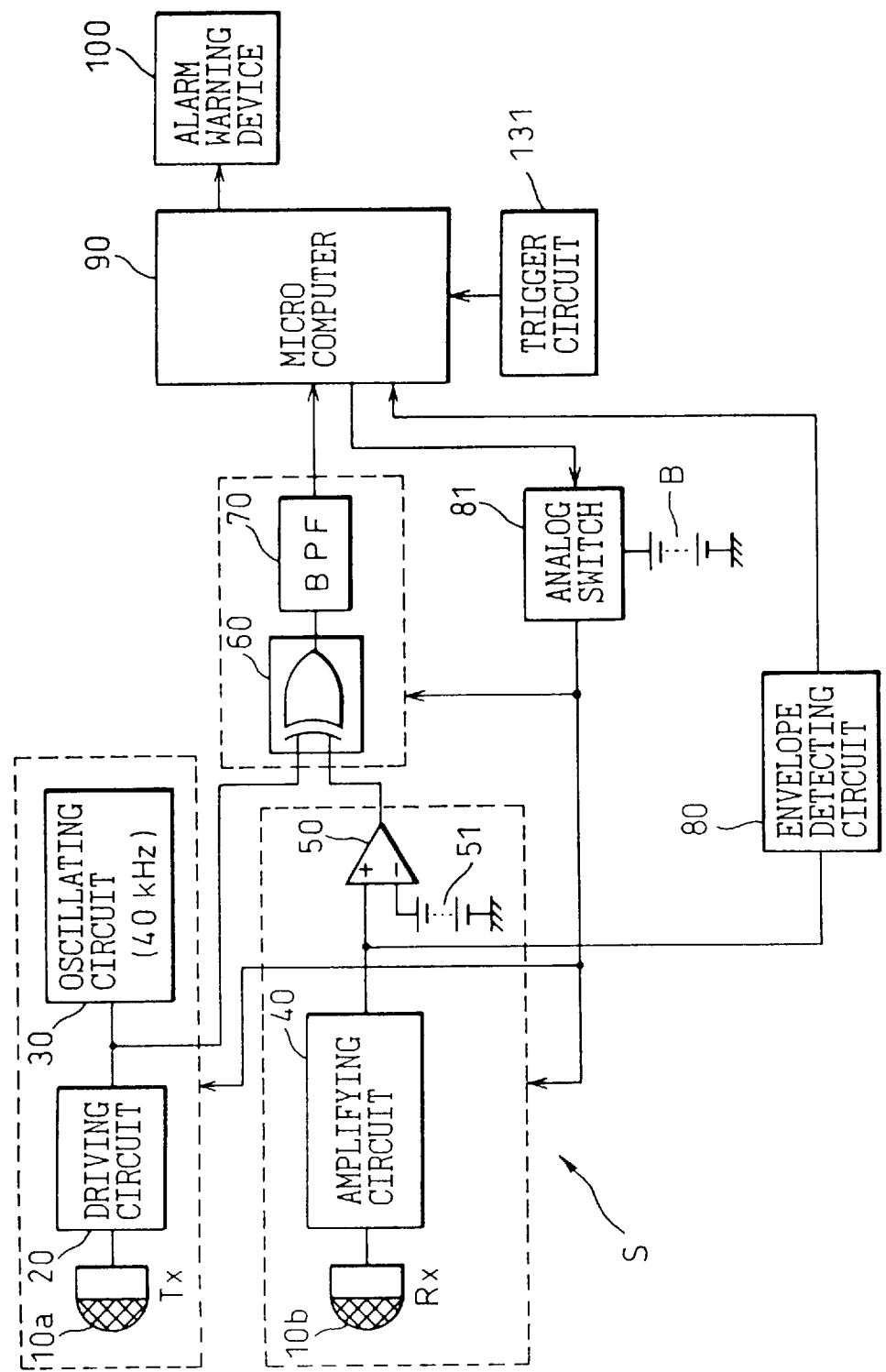
FIG. 8 is a block diagram of an intrusion detecting apparatus according to a second embodiment of the present invention.

FIG. 8 is a block diagram of an intrusion detecting apparatus according to a second embodiment of the present invention. The difference between the apparatus shown in FIG. 1 and the apparatus shown in FIG. 8 is that, in FIG. 8, an analog switch 81 and a trigger circuit 131 are additionally provided. The other elements are the same as those in FIG. 1 and are denoted by the same reference numerals. At least one of the ultrasonic transmitter 10a, the driving circuit 20, the oscillating circuit 30, the ultrasonic receiver 10b, the amplifying circuit 40, the comparing circuit 50, the phase difference output circuit 60 and the BPF 70 is supplied with power from a battery B through the analog switch 81 to be turned to their operating states.

That is, the analog switch 81 is turned ON under the control of the microcomputer 90 to supply power from the battery B to at least one of the ultrasonic transmitter 10a, the driving circuit 20, the oscillating circuit 30, the ultrasonic receiver 10b, the amplifying circuit 40, the comparing circuit 50, the phase difference output circuit 60 and the BPF 70, and is turned OFF to cut the power supply.

The trigger circuit 131 generates trigger pulses with a predetermined period P of, for example, 160 milliseconds, to output to the microcomputer 90.

Figure 9:
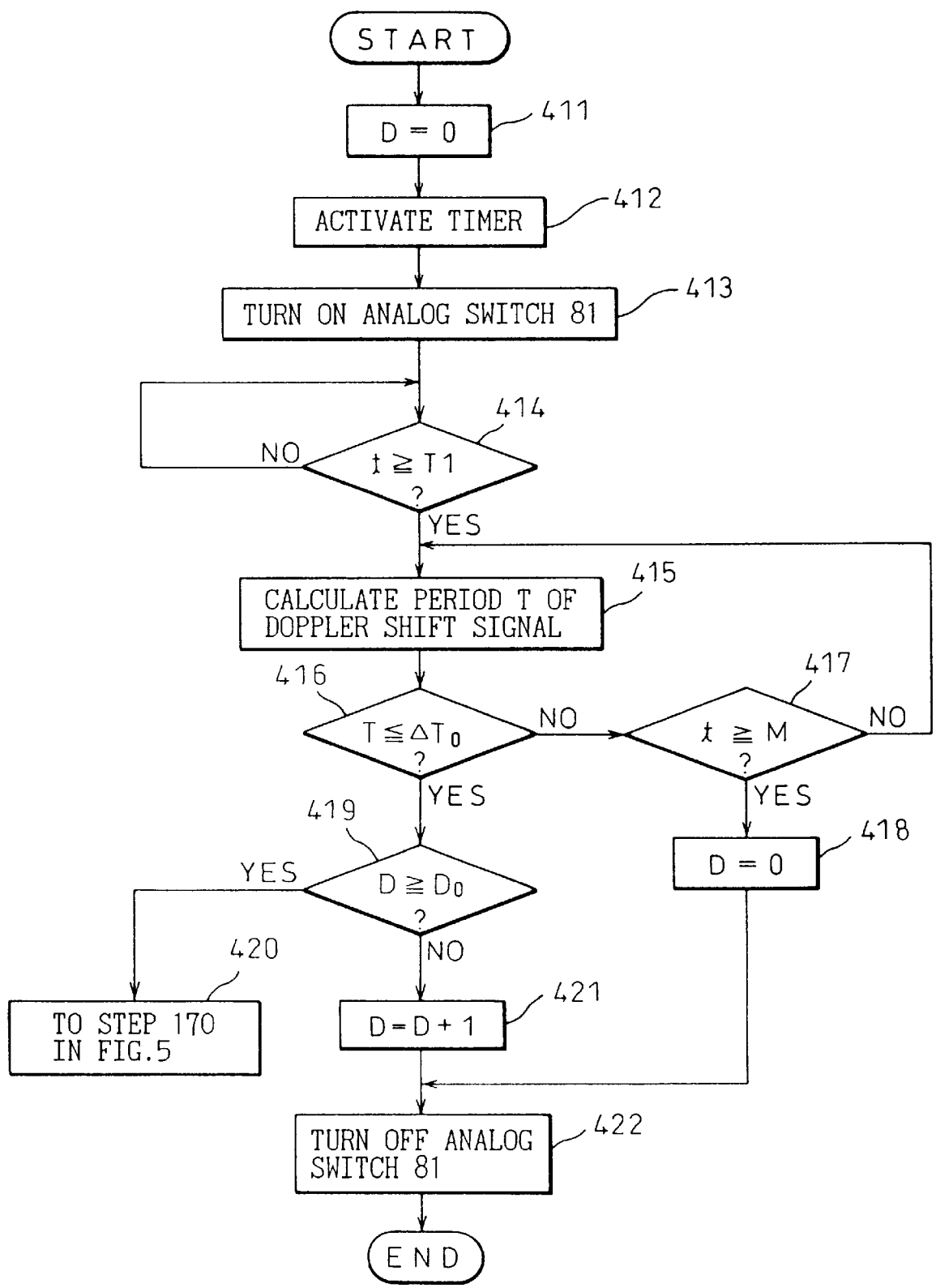
FIG. 9 is a flowchart showing a first example of the operation of a microcomputer in the apparatus shown in FIG. 8.

In place of the steps 110 to 151 in FIG. 5, the microcomputer 90 executes a computer program in accordance with the flowchart shown in FIG. 9, and based on the output of the BPF 70. By this execution, the analog switch 81 is controlled, and the calculating process necessary to judge whether or not there is an intrusion is performed. The execution of the computer program by the microcomputer 90 is started each time when the trigger circuit 131 outputs a trigger pulse. Note that the above-mentioned computer program is previously stored in the ROM in the microcomputer 90.

The alarm warning device 100 is controlled by the microcomputer 90 to output an alarm indicating an illegal intrusion.

Referring to FIG. 9, the operation of the microcomputer 90 in accordance with this second embodiment will be described.

First, at step 411, an initialization process is executed so that a count value D is initialized to zero.

Then at the next step 412, a built-in timer in the microcomputer 100 is reset and activated. Thus the timer starts to count the time.

Then at step 413, an ON process command is output to the analog switch 81 so that the analog switch 81 is turned ON. Thus, power is supplied from the battery B to the ultrasonic transmitter 10a, the driving circuit 20, the oscillating circuit 30, the ultrasonic receiver 10b, the amplifying circuit 40, the comparing circuit 50, the phase difference output circuit 60 and the BPF 70 to put them in their operating states.

While the count value t of the timer is within a waiting time T1, the judgement at step 414 is "NO". In this state, the ultrasonic transmitter 10a is driven by the driving circuit 20 based on the oscillating pulses from the oscillating circuit 30 to transmit an ultrasonic signal into the passenger's compartment of the vehicle. The transmitted ultrasonic signal is reflected by material bodies or walls in the passenger's compartment of the vehicle. The reflected ultrasonic wave is received by the ultrasonic receiver 10b. The received signal is amplified by the amplifying circuit 40 to be output as an amplified voltage.

Then the amplified voltage is compared by the comparing circuit 50 with the reference voltage $V_r$ from the reference power supply 51. When the amplified voltage is higher than the reference voltage $V_r$, the comparing circuit 50 outputs a high level compared signal. After this, the phase difference output circuit 60 generates a phase difference output signal in accordance with the difference between the phase of the oscillating pulse from the oscillating circuit 30 and the phase of the compared signal from the comparing circuit 50. Then the BPF 70 outputs a doppler shift signal based on the phase difference output signal.

Figure 10:
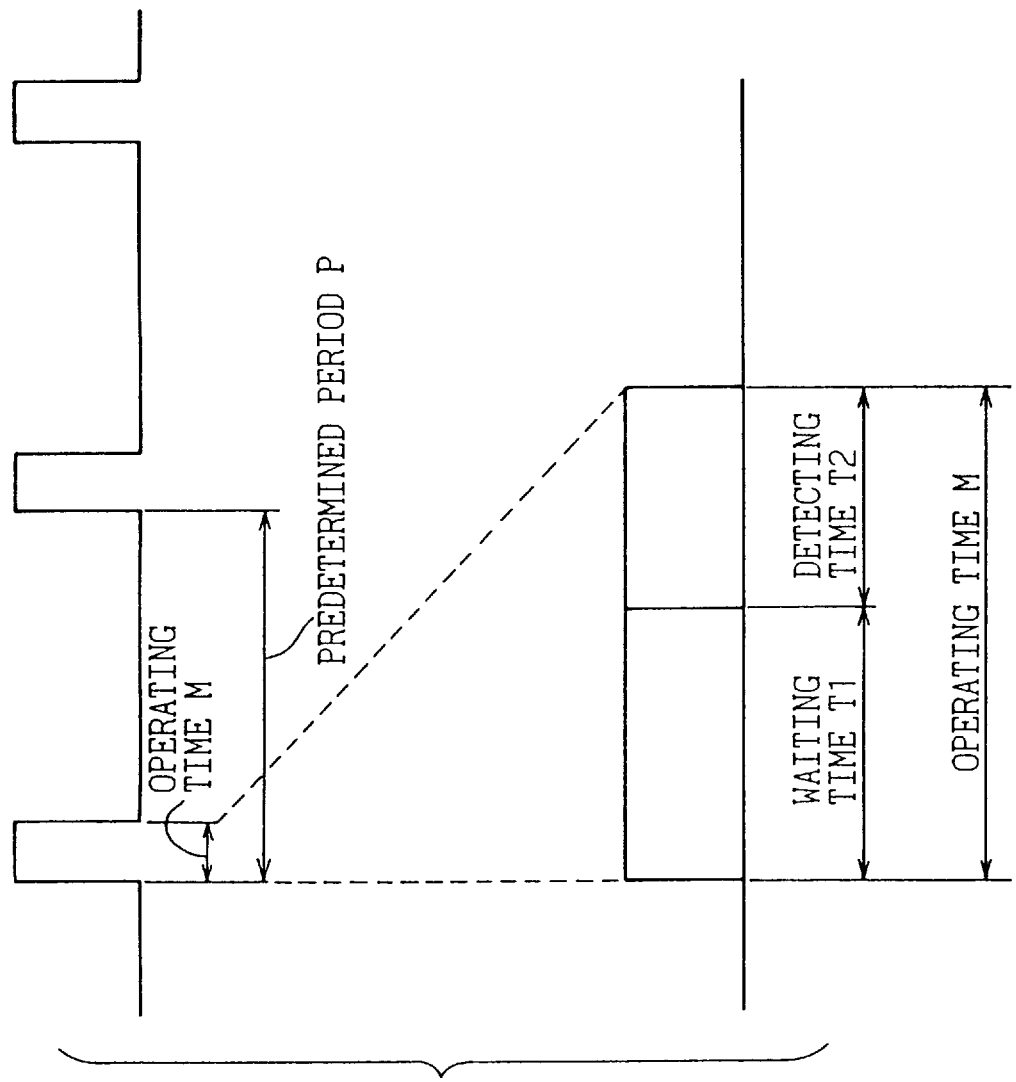
FIG. 10 is a timing chart showing an intermittent operation of the apparatus shown in FIG. 8.

The above-mentioned waiting time T1 is introduced to specify a detecting time T2 and an operating time M as shown in FIG. 10. The operating time M represents the time to allow the operation of the ultrasonic transmitter 10a, the driving circuit 20, the oscillating circuit 30, the ultrasonic receiver 10b, the amplifying circuit 40, the comparing circuit 50, the phase difference output circuit 60 and the BPF 70.

This operating time M is, as shown in the lower part of FIG. 10 in an expanded view, the sum of the waiting time T1 and the detecting time T2. The operating time M is set in such a way that the power consumption of the battery B can be reduced as much as possible. The waiting time T1 represents a time in which the ultrasonic transmitter 10a transmits an ultrasonic signal, the transmitted ultrasonic signal is reflected in the passenger's compartment, the reflected ultrasonic signal is received by the ultrasonic receiver 10b, and the microcomputer 90 receives the output of the BPF 70.

The detecting time T2 corresponds to a time which is sufficient to properly detect a movement of a person intruding into the passenger compartment of the vehicle. The movement speed of a person intruding into the passenger's compartment is considered to be about from 0.2 m/sec to 2 m/sec. Therefore, the frequency of the doppler shift signal due to the movement of a person is from 44 Hz to 450 Hz. Accordingly, to correctly detect the movement of a person, the minimum detecting time T2 must be a time corresponding to about 44 Hz, that is about 25 milliseconds.

In view of the above analysis, according to this second embodiment, the operating time M is set to be, for example 55 milliseconds. The shorter the operating time M, the lower the power consumption of the battery B. Note that the operating time M is previously stored in the ROM in the microcomputer 90.

Under the above condition, when the count value t of the timer reaches the waiting time T1, the process proceeds to step 415. The steps 415 and 416 in FIG. 9 are similar to the steps 120 and 130 in FIG. 5.

At step 416, when a period T of the doppler shift signal is not within a predetermined period $\Delta T_0$, it is judged that there is no intrusion into the passenger compartment, and the process proceeds to step 417. As long as the count value t of the timer is smaller than the operating time M, the steps 415 to 417 are repeated.

During this repetition, when the judgement at step 416 becomes "YES", it is tentatively determined that a person has intruded into the passenger compartment, and the process proceeds to step 419 where it is judged as to whether or not the count number D has reached a predetermined number $D_0$. This predetermined number $D_0$ is a number of continuous judgements by which it is correctly judged that a person has certainly intruded. The predetermined number $D_0$ is determined by taking an error in the judgements of "YES" at step 416 into account.

At step 419, when the count number D is smaller than the predetermined number $D_0$, the process proceeds to step 421 where the count number D is incremented.

On the other hand, after the judgement of "NO" at step 416, when the count value t reaches to the operating time M at step 417, it is judged that there has been no intrusion into the passenger compartment during the current operating time M so that the process proceeds to step 418 where the count number D is cleared to zero.

When the process proceeds from step 418 or step 421 to step 422, an OFF command is output to the analog switch 81 to turn OFF the analog switch 81. By this operation, the ultrasonic transmitter 10a, the driving circuit 20, the oscillating circuit 30, the ultrasonic receiver 10b, the amplifying circuit 40, the comparing circuit 50, the phase difference output circuit 60 and the BPF 70 are cut off from the battery B to stop their operations. At the same time, the microcomputer 90 itself assumes its sleep mode, i.e., a low current consumption mode.

After this, based on the trigger pulse outputs from the trigger circuit 131, the above-described processes by the microcomputer 90 are repeated, and when the judgement at step 419 is "YES", the process proceeds to step 170 in FIG. 5.

As described above, according to this second embodiment, based on the process by the microcomputer 90 which is operated at the output interval (predetermined period P) of the trigger pulse from the trigger circuit 131, the power supply from the battery B to the ultrasonic transmitter 10a, the driving circuit 20, the oscillating circuit 30, the ultrasonic receiver 10b, the amplifying circuit 40, the comparing circuit 50, the phase difference output circuit 60 and the BPF 70 is effected only during the operating time M in the predetermined period P.

Thus, the intrusion detecting apparatus of an ultrasonic doppler type according to this second embodiment operates intermittently at each operating time M in the predetermined period P. Therefore, even when the vehicle is in a stopped state, the power consumption of the battery B which is necessary to perform the above operation can be greatly reduced in comparison with the power consumption necessary to continuously operate the intrusion detecting apparatus.

Also, even when the above-mentioned intermittent operation is effected, since the operating time M and the detecting time T2 are set as mentioned above, the calculation of the period T of the doppler shift signal at step 415 and the judgement of whether or not there is an illegal intrusion at step 416 can be correctly carried out.

Next, modifications of the above-described second embodiment will be described with reference to FIGS. 11, 12A and 12B.

Figure 11:
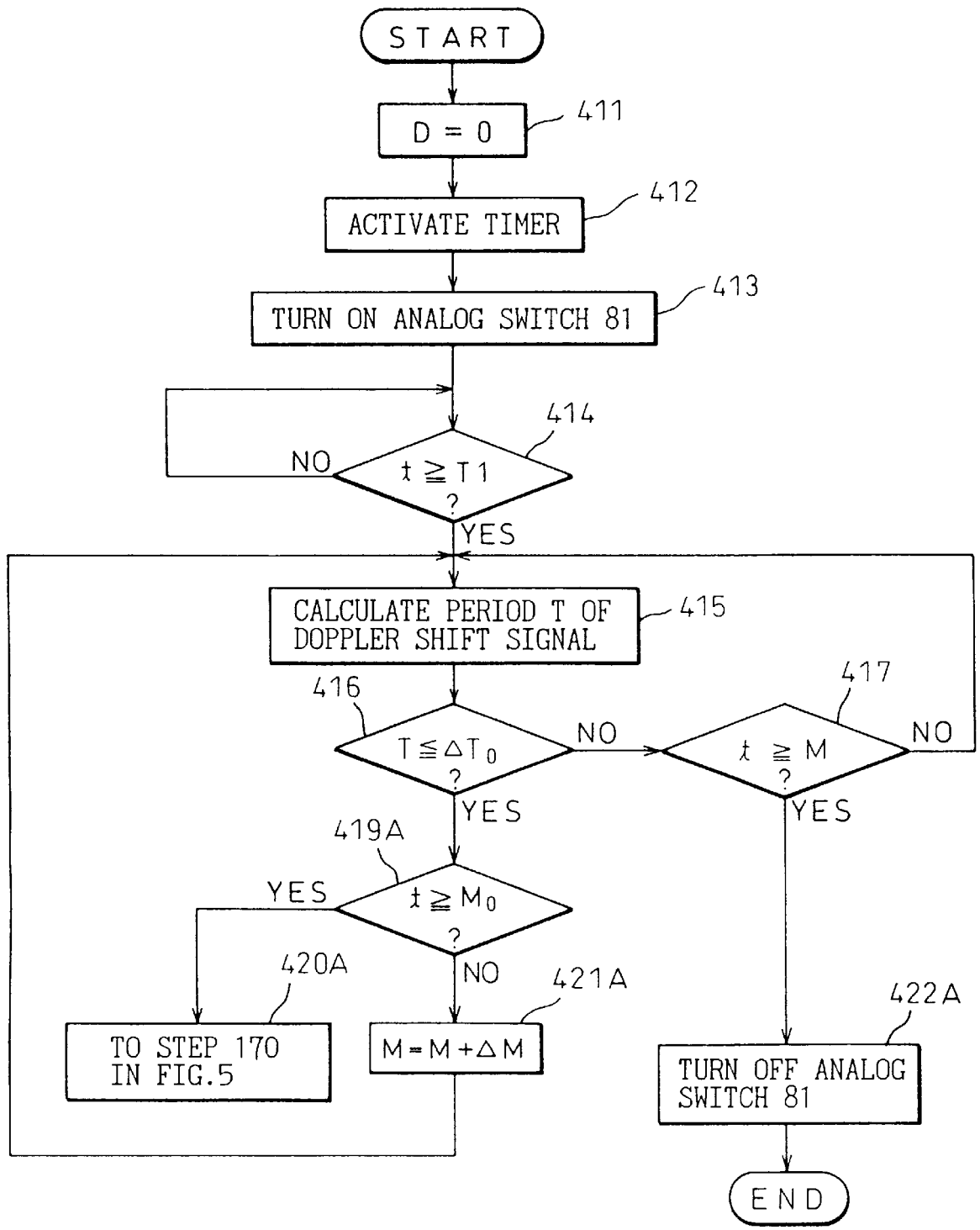
FIG. 11 is a flowchart showing a second example of the operation of a microcomputer in the apparatus shown in FIG. 8.
Figure 12A:
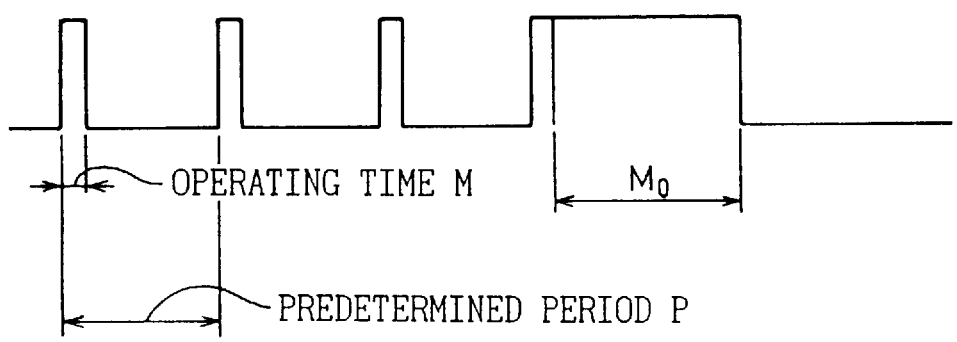
FIG. 12A is a timing chart showing an intermittent operation in the operation shown in FIG. 11 when an alarm is generated.

FIG. 11 is a flowchart explaining the operation of the microcomputer according to another example of the second embodiment of the present invention. In FIG. 11, steps 419A, 420A, 421A, and 422A are different from steps 419, 420, 421, and 422 in FIG. 9, respectively, and the other steps in FIG. 11 are the same as those in FIG. 9.

Figure 12B:
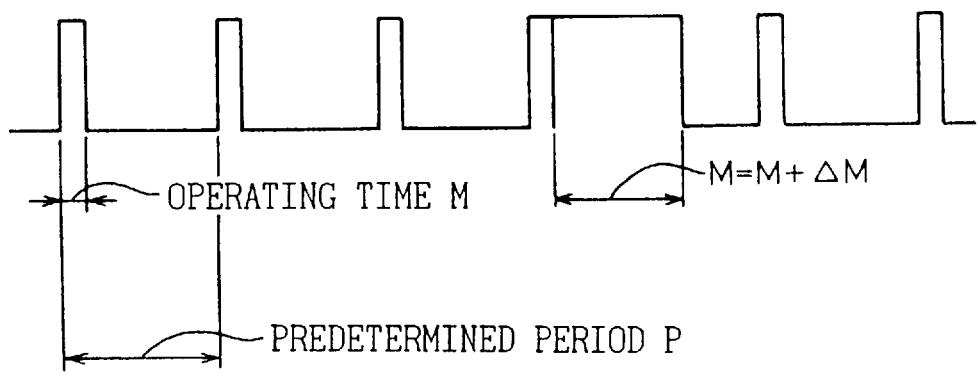
FIG. 12B is a timing chart showing an intermittent operation in the operation shown in FIG. 11 when an alarm is not generated.

In FIG. 11, at step 416, when the period T of the doppler shift signal is not within the predetermined frequency range $\Delta T_0$, it is judged that there is no intrusion into the passenger compartment so that the process proceeds to step 417 where the judgement is "NO" because the count value t is smaller than the extended operating time M (see FIG. 12B).

Then steps 415 through 417 are repeated until the judgement at step 416 becomes "YES". When the judgement at step 416 becomes "YES", it is tentatively judged that a person has intruded into the passenger compartment so that the process proceeds to step 419A, where it is judged whether or not the count value t has reached a predetermined continuous time $M_0$. This continuous time $M_0$ represents a time in which it can be correctly judged that a person has surely intruded, taking into account an error judgement of "YES" at step 416 due to external noise.

When the count value t is shorter than a predetermined continuous time $M_0$, the judgement at step 419A becomes "NO" so that the process proceeds to step 421A where the operating time M is extended by $\Delta M$, where $\Delta M$ represents a predetermined extending time to be added to the previous operating time M.

Then, while the process through steps 415, 416, and 417 or the process through steps 415, 416, 419A and 421A is repeated, when the judgement at step 416 becomes "NO", and then when the judgement at step 417 becomes "YES" (see FIG. 12B), it is judged that there has been no intrusion into the passenger compartment during the above-mentioned continuous time $M_0$ so that the process proceeds to step 422A where the analog switch 81 is turned OFF by sending an OFF command to the analog switch 81.

Thus, the ultrasonic transmitter 10a, the driving circuit 20, the oscillating circuit 30, the ultrasonic receiver 10b, the amplifier 40, the comparing circuit 50, the phase difference output circuit 60 and the BPF 70 are cut off from the power supply from the battery B so that these operations are stopped. After this, the above-mentioned processes are repeated based on the output from a new trigger pulse from the trigger circuit 131.

On the other hand, when the judgement at step 416 becomes "YES", and then when the count value t reaches the predetermined continuous time $M_0$, the judgement at step 419A becomes "YES" so that the process proceeds to step 420A where the process proceeds to step 170 in FIG. 5 in the similar way as that in the above-described second embodiment of the vehicle.

As described above, according to the first and the second examples of the second embodiment of the present invention, based on the process by the microcomputer 90 which is driven intermittently at output intervals (predetermined period P) by the trigger pulses from the trigger circuit 131, the power supply from the battery B to the ultrasonic transmitter 10b, the amplifying circuit 40, the comparing circuit 50, the phase difference output circuit 60 and the BPF 70 are effected only during the operating time M within the predetermined period P.

Therefore, the intrusion detecting apparatus according to the second embodiment of the invention operates intermittently in each operating time M within the predetermined period P so that the power consumption of the battery B necessary to effect these operation can be greatly reduced in comparison with the power consumption B necessary to continuously operate the intrusion detecting apparatus.

It should be noted that, in the above-described second embodiment, under the intermittent operation, each time after the judgement of "YES" at step 416, and when the judgement at step 419A is "NO", the operating time M is extended by $\Delta M$. Therefore, the judgement at step 419A becomes "YES" only when the count value t reaches to the predetermined continuous time $M_0$ after the continuous judgements of the intrusion within the extended operating time M. This means that the judgement of an illegal intrusion can be correctly effected without any error judgement. The other effects are the same as those in the previous embodiment.

In the above-described first and the second embodiments, the intrusion detecting apparatus for a vehicle is of an ultrasonic doppler type, however, the present invention is not restricted to this, but may be applied to an intrusion detecting apparatus for a vehicle of an ultrasonic amplitude modulation type or an ultrasonic pulse radar type.

Further, each step in each flowchart of the first or the second embodiment may be realized by a hard logic construction for performing the same function as that of the step.

We claim:

1. An intrusion detecting apparatus for a vehicle comprising:
    an ultrasonic transmitting/receiving sensor comprising:
        an ultrasonic transmitter, provided in a passenger compartment of said vehicle, for transmitting an ultrasonic signal, and
        an ultrasonic receiver, arranged closely to said ultrasonic transmitter, for receiving said ultrasonic signal;
    intrusion detecting means for detecting whether or not there is an intrusion into said passenger compartment based on said ultrasonic signal received by said ultrasonic receiver;
    stopping means for intermittently stopping a transmission of said ultrasonic signal from said ultrasonic transmitter; and
    cover detecting means for detecting whether or not said ultrasonic transmitting/receiving sensor is covered, said cover detecting means comprising means for determining when a level of said ultrasonic signal received by said ultrasonic receiver is equal to or below an upper limit level, wherein
    when said ultrasonic receiver receives said ultrasonic signal having said level being equal to or below said upper limit level after said stopping means stops said transmission of said ultrasonic signal, said cover detecting means judges that said ultrasonic transmitting/receiving sensor is covered and when said ultrasonic receiver receives said ultrasonic signal having said level being greater than said upper limit level after said stopping means stops said transmission of said ultrasonic signal, said cover detecting means judges that said ultrasonic transmitting/receiving sensor is not covered.

2. An intrusion detecting apparatus as claimed in claim 1, wherein said cover detecting means further comprises:
    counting means for counting a number of times when the level of said ultrasonic signal received by said ultrasonic receiver becomes equal to or below said upper limit level after respective stops of said transmission of said ultrasonic signal from said ultrasonic transmitter; and
    period judging means for judging whether or not said number of times counted by said counting means reaches a predetermined number representing a period suitable to exclude an influence of disturbance on a result detected by said cover detecting means;
    said cover detecting means detecting, when said period judging means judges that said number of times counted reaches said predetermined number, that said ultrasonic transmitting/receiving sensor is covered.

3. An intrusion detecting apparatus as claimed in claim 1, wherein said determining means;

determines, each time after said stopping means stops said transmission, whether or not said level of said ultrasonic signal received by said ultrasonic receiver is equal to or below said upper limit level representing that said ultrasonic transmitting/receiving sensor is covered; and said cover detecting means further comprises:

setting means for setting, each time after said stopping means stops said transmission, count data representing a result of a determination by said determining means;

calculating means for calculating a sum of a predetermined latest number of said count data; and sum determining means for determining, each time after said stopping means stops said transmission, whether or not said sum reaches a predetermined value of a number of said count data representing that said ultrasonic transmitting/receiving sensor is covered, wherein said cover detecting means detects, when said sum determining means determines that said sum reaches said predetermined value, that said ultrasonic transmitting/receiving sensor is covered.

4. An intrusion detecting apparatus as claimed in claim 1, wherein said ultrasonic transmitting/receiving sensor is provided on a front windshield in said passenger compartment of said vehicle.

5. An intrusion detecting apparatus as claimed in claim 1, further comprising control means for causing an intermittent operation of at least one of said ultrasonic transmitter, said ultrasonic receiver, and said intrusion detecting means.

6. An intrusion detecting apparatus as claimed in claim 5, wherein said intermittent operation is carried out to reduce a power consumption of said at least one of said ultrasonic transmitter, said ultrasonic receiver, and said intrusion detecting means.

7. An intrusion detecting apparatus as claimed in claim 5, wherein said intrusion detecting means comprises:

first judging means for judging whether or not a doppler shift amount between a reflected ultrasonic signal and said received ultrasonic signal is within a predetermined range representing an illegal intrusion into said passenger compartment;

second judging means for judging whether or not a number of judgments by said first judging means indicating that said doppler shift amount is within said predetermined range reaches a predetermined number of judgments by which said second judging means can determine, even when there is a disturbance, that a person has intruded into said passenger compartment.

8. An intrusion detecting apparatus as claimed in claim 5, wherein said intrusion detecting means comprises:

first judging means for judging whether or not a doppler shift amount between a reflected ultrasonic signal and said received ultrasonic signal is within a predetermined range representing an illegal intrusion into said passenger compartment;

extending means for extending an operating time of an intermittent operation when said first judging means judges that said doppler shift amount is within said predetermined range;

second judging means for judging whether or not a judgment by said first judging means that said doppler shift amount is within said predetermined range continues for said operating time extended by said extending means, wherein a judgment of whether or not there is an illegal intrusion into said passenger compartment is carried out based on said judgment of said second judging means.

9. An intrusion detecting apparatus as claimed in claim 5, wherein said control means includes switching means for intermittently disconnecting said at least one of said ultrasonic transmitter, said ultrasonic receiver, and said intrusion detecting means.

10. An intrusion detecting apparatus as claimed in claim 1, wherein said stopping means stops said transmission of said ultrasonic signal at a time which does not influence detection of whether or not said transmitting/receiving sensor is covered.

11. An intrusion detecting apparatus as claimed in claim 1, wherein, after said intrusion detecting means detects that there is no intrusion into said passenger compartment, said cover detecting means is operated.

12. An intrusion detecting apparatus as claimed in claim 1, further comprising:

envelope detecting means for detecting an envelope of said ultrasonic signal received by said ultrasonic receiving sensor, wherein when said envelope detecting means detects that said ultrasonic receiving sensor receives said envelope having a lower level than a predetermined level, said cover detecting means judges that said ultrasonic transmitting/receiving sensor is covered, and when said envelope detecting means detects that said ultrasonic receiving sensor receives said envelope having a level higher than or equal to said predetermined level, said cover detecting means judges that said ultrasonic transmitting/receiving sensor is not covered.

13. An intrusion detecting apparatus for a vehicle comprising:

an ultrasonic transmitting/receiving sensor comprising:

an ultrasonic transmitter, provided in a passenger compartment of said vehicle, for transmitting an ultrasonic signal, and an ultrasonic receiver, arranged closely to said ultrasonic transmitter, for receiving said ultrasonic signal;

intrusion detecting means for detecting whether or not there is an intrusion into said passenger compartment based on said ultrasonic signal received by said ultrasonic receiver;

stopping means for intermittently stopping a transmission of said ultrasonic signal from said ultrasonic transmitter; and cover detecting means for detecting whether or not said ultrasonic transmitting/receiving sensor is covered, based on said ultrasonic signal by said ultrasonic receiver after said stopping means stops said transmission of said ultrasonic signal from said ultrasonic transmitter, and in response to a predetermined condition representing that said ultrasonic transmitting/receiving sensor is covered, said cover detecting means comprising:

means for determining, only when a level of said ultrasonic signal received by said ultrasonic receiver is equal to or below an upper limit, that said ultrasonic transmitting/receiving sensor is covered, counting means for counting a number of times when said level of said ultrasonic signal received by said ultrasonic receiver becomes equal to or below said upper limit level after respective stops of said transmission of said ultrasonic signal from said ultrasonic transmitter, and period judging means for judging whether or not said number of times counted by said counting means reaches a predetermined number representing a period suitable to exclude an influence of disturbance on a result detected by said cover detecting means, said cover detecting means detecting, when said period judging means judges that said number of times counted reaches said predetermined number, that said ultrasonic transmitting/receiving sensor is covered.

14. An intrusion detecting apparatus as claimed in claim 13, wherein said cover detecting means comprises:

level determining means for determining, each time after said stopping means stops said transmission, whether or not a level of said ultrasonic signal received by said ultrasonic receiver is equal to or below an upper limit level in levels representing that said ultrasonic transmitting/receiving sensor is covered;

setting means for setting, each time after said stopping means stops said transmission, count data representing a result of a determination by said level determining means;

calculating means for calculating a sum of a predetermined latest number of said count data; and sum determining means for determining, each time after said stopping means stops said transmission, whether or not said sum reaches a predetermined value of a number of said count data representing that said ultrasonic transmitting/receiving sensor is covered, wherein said cover detecting means detects, when said sum determining means determines that said sum reaches said predetermined value, that said ultrasonic transmitting/receiving sensor is covered.

15. An intrusion detecting apparatus as claimed in claim 13, wherein said ultrasonic transmitting/receiving sensor is provided on a front windshield in said passenger compartment of said vehicle.

16. An intrusion detecting apparatus as claimed in claim 13, wherein said ultrasonic transmitting/receiving sensor is provided on an upper portion of each seat belt pillar in said passenger compartment of said vehicle.

17. An intrusion detecting apparatus as claimed in claim 13, further comprising control means for causing an intermittent operation of at least one of said ultrasonic transmitter, said ultrasonic receiver, and said intrusion detecting means.

18. An intrusion detecting apparatus as claimed in claim 17, wherein said intermittent operation is carried out to reduce a power consumption of said at least one of said ultrasonic transmitter, said ultrasonic receiver, and said intrusion detecting means.

19. An intrusion detecting apparatus as claimed in claim 17, wherein said intrusion detecting means comprises:

first judging means for judging whether or not a doppler shift amount between a reflected ultrasonic signal and said received ultrasonic signal is within a predetermined range representing an illegal intrusion into said passenger compartment;

second judging means for judging whether or not a number of judgments by said first judging means indicating that said doppler shift amount is within said predetermined range reaches a predetermined number of judgments by which said second judging means can determine, even when there is a disturbance, that a person has intruded into said passenger compartment.

20. An intrusion detecting apparatus as claimed in claim 17, wherein said intrusion detecting means comprises:

first judging means for judging whether or not a doppler shift amount between a reflected ultrasonic signal and said received ultrasonic signal is within a predetermined range representing an illegal intrusion into said passenger compartment;

extending means for extending an operating time of an intermittent operation when said first judging means judges that said doppler shift amount is within said predetermined range;

second judging means for judging whether or not a judgment by said first judging means that said doppler shift amount is within said predetermined range continues for said operating time extended by said extending means, wherein a judgment of whether or not there is an illegal intrusion into said passenger compartment is carried out based on said judgment of said second judging means.

21. An intrusion detecting apparatus as claimed in claim 17, wherein said control means includes switching means for intermittently disconnecting said at least one of said ultrasonic transmitter, said ultrasonic receiver, and said intrusion detecting means.

22. An intrusion detecting apparatus as claimed in claim 13, wherein said ultrasonic transmitting/receiving sensor is provided on an upper portion of each seat belt pillar in said passenger compartment of said vehicle.

23. An intrusion detecting apparatus for a vehicle comprising:

an ultrasonic transmitting/receiving sensor comprising:
an ultrasonic transmitter, provided in a passenger compartment of said vehicle, for transmitting an ultrasonic signal, and
an ultrasonic receiver, arranged closely to said ultrasonic transmitter, for receiving said ultrasonic signal;

intrusion detecting means for detecting whether or not there is an intrusion into said passenger compartment based on said ultrasonic signal received by said ultrasonic receiver;

stopping means for intermittently stopping a transmission of said ultrasonic signal from said ultrasonic transmitter; and cover detecting means for detecting whether or not said ultrasonic transmitting/receiving sensor is covered, based on said ultrasonic signal received by said ultrasonic receiver after said stopping means stops said transmission of said ultrasonic signal from said ultrasonic transmitter, and in response to a predetermined condition representing that said ultrasonic transmitting/receiving sensor is covered, said cover detecting means comprising:

level determining means for determining, each time after said stopping means stops said transmission, whether or not a level of said ultrasonic signal received by said ultrasonic receiver is equal to or below an upper limit in level representing that said ultrasonic transmitting/receiving sensor is covered;

setting means for setting, each time after said stopping means stops said transmission, count data representing a result of a determination by said level determining means;

calculating means for calculating a sum of a predetermined latest number of said count data, and sum determining means for determining, each time after said stopping means stops said transmission, whether or not said sum reaches a predetermined value of a number of said count data representing that said ultrasonic transmitting/receiving sensor is covered, wherein said cover detecting means detects, when said sum determining means determines that said sum reaches said predetermined value, that said ultrasonic transmitting/ receiving sensor is covered.

24. An intrusion detecting apparatus as claimed in claim 23, wherein said ultrasonic transmitting/receiving sensor is provided on a front windshield in said passenger compartment of said vehicle.

25. An intrusion detecting apparatus as claimed in claim 23, wherein said ultrasonic transmitting/receiving sensor is provided on an upper portion of each seat belt pillar in said passenger compartment of said vehicle.

26. An intrusion detecting apparatus as claimed in claim 23, further comprising control means for causing an intermittent operation of at least one of said ultrasonic transmitter, said ultrasonic receiver, and said intrusion detecting means.

27. An intrusion detecting apparatus as claimed in claim 26, wherein said intermittent operation is carried out to reduce a power consumption of said at least one of said ultrasonic transmitter, said ultrasonic receiver, and said intrusion detecting means.

28. An intrusion detecting apparatus as claimed in claim 26, wherein said intrusion detecting means comprises:

first judging means for judging whether or not a doppler shift amount between a reflected ultrasonic signal and said received ultrasonic signal is within a predetermined range representing an illegal intrusion into said passenger compartment;

second judging means for judging whether or not a number of judgments by said first judging means indicating that said doppler shift amount is within said predetermined range reaches a predetermined number of judgments by which said second judging means can determine, even when there is a disturbance, that a person has intruded into said passenger compartment.

29. An intrusion detecting apparatus as claimed in claim 26, wherein said intrusion detecting means comprises:

first judging means for judging whether or not a doppler shift amount between a reflected ultrasonic signal and said received ultrasonic signal is within a predetermined range representing an illegal intrusion into said passenger compartment;

extending means for extending an operating time of an intermittent operation when said first judging means judges that said doppler shift amount is within said predetermined range;

second judging means for judging whether or not a judgment by said first judging means that said doppler shift amount is within said predetermined range continues for said operating time extended by said extending means, wherein a judgment of whether or not there is an illegal intrusion into said passenger compartment is carried out based on said judgment of said second judging means.

30. An intrusion detecting apparatus as claimed in claim 26, wherein said control means includes switching means for intermittently disconnecting said at least one of said ultrasonic transmitter, said ultrasonic receiver, and said intrusion detecting means.

* * * * *